(12) United States Patent
Shin et al.

(10) Patent No.: US 12,333,410 B2
(45) Date of Patent: Jun. 17, 2025

(54) NETWORK ALIGNMENT METHOD AND APPARATUS

(71) Applicant: UIF (University Industry Foundation), Yonsei University, Seoul (KR)

(72) Inventors: Won-Yong Shin, Seoul (KR); Jin-Duk Park, Seoul (KR)

(73) Assignee: UIF (University Industry Foundation), Yonsei Universtiy, Seoul (KR)

(*) Notice: Subject to any disclaimer, the term of this patent is extended or adjusted under 35 U.S.C. 154(b) by 295 days.

(21) Appl. No.: 18/183,389

(22) Filed: Mar. 14, 2023

(65) Prior Publication Data
US 2023/0297812 A1    Sep. 21, 2023

(30) Foreign Application Priority Data
Mar. 16, 2022  (KR) .......................... 10-2022-0032657

(51) Int. Cl.
*G06N 3/045* (2023.01)

(52) U.S. Cl.
CPC .................................. *G06N 3/045* (2023.01)

(58) Field of Classification Search
CPC ........ G06F 16/00; G06F 16/285; G06F 16/54; G06F 18/24137; G06F 18/2413; G06N 3/042; G06N 3/045; G06N 3/082; G06N 5/00; G06N 3/08; G06Q 50/16; G06V 10/44; G16B 10/00; G16B 45/00; H04L 41/0866
See application file for complete search history.

(56) References Cited

U.S. PATENT DOCUMENTS

| | | | | |
|---|---|---|---|---|
| 6,121,969 A | * | 9/2000 | Jain | G06F 16/54 |
| | | | | 715/850 |
| 9,530,047 B1 | * | 12/2016 | Tang | G06V 10/44 |
| 9,753,964 B1 | * | 9/2017 | Marshall | G06F 18/24137 |
| 10,887,182 B1 | * | 1/2021 | Xie | H04L 41/0866 |

(Continued)

OTHER PUBLICATIONS

Jin-Duk Park et al., "Grad-Align: Gradual Network Alignment via Graph Neural Networks" KICS Fall Conference 2021, Nov. 17, 2021.

(Continued)

*Primary Examiner* — Gerald Gauthier (57) ABSTRACT

A network alignment method comprises the steps of: receiving two networks as inputs and performing a neural network operation respectively, vectorizing a plurality of nodes of each of the two networks; calculating a dual-perception similarity based on an embedding similarity between the vectorized nodes of each of the two networks, and a Tversky similarity representing a ratio of the number of previously aligned nodes included in a neighboring node to the normalized number of neighboring nodes of each combined node when configuring a node pair by combining nodes that are not aligned in the two networks; and selecting node pairs to be aligned among a plurality of nodes of the two networks based on the dual-perception similarity, thereby partially aligning the two networks so that the number of node pairs aligned in the two networks gradually increases according to the dual-perception similarity updated according to the two partially aligned networks.

10 Claims, 7 Drawing Sheets

(56) References Cited

U.S. PATENT DOCUMENTS

| | | | |
|---|---|---|---|
| 2002/0049542 A1* | 4/2002 | Rzhetsky | G16B 10/00 435/6.12 |
| 2008/0133197 A1* | 6/2008 | Bang | G16B 45/00 703/11 |
| 2016/0071018 A1* | 3/2016 | Hernandez | G06N 5/00 706/54 |
| 2016/0283840 A1* | 9/2016 | Amir | G06N 3/082 |
| 2018/0203915 A1* | 7/2018 | Marshall | G06F 16/00 |
| 2018/0203916 A1* | 7/2018 | Rafsky | G06F 16/285 |
| 2018/0203917 A1* | 7/2018 | Marshall | G06F 16/285 |
| 2019/0188337 A1* | 6/2019 | Keane | G06Q 50/16 |
| 2019/0354689 A1* | 11/2019 | Li | G06N 3/045 |
| 2020/0210843 A1* | 7/2020 | Tao | G06N 3/045 |
| 2021/0357746 A1* | 11/2021 | Wu | G06N 3/08 |
| 2023/0297812 A1* | 9/2023 | Shin | G06N 3/042 704/232 |

OTHER PUBLICATIONS

Jin-Duk Park et al., "On the Power of Gradual Network Alignment Using Dual-Perception Similarities" <arXiv:2201.10945v1 [cs.SI] Jan. 26, 2022>.

Jin-Duk Park et al., "Grad-Align: Gradual Network Alignment via Graph Neural Networks (Student Abstract)" 36th AAAI Conference on Artificial Intelligence Feb. 24, 2022 vol. 36 No. 11: pp. 13027-13028.

J. D. Park et al., "Gradual network alignment with edge augmentation," in Proc. 2022 Winter Conf. Korean Inst. Commun. Inf. Sci. (KICS Winter Conference 2022), Feb. 9-11, 2022.

* cited by examiner

NETWORK ALIGNMENT METHOD AND APPARATUS

CROSS-REFERENCE TO RELATED APPLICATIONS

This application claims priority under 35 U.S.C. § 119(a) to Korean Patent Application No. 10-2022-0032657, filed on Mar. 16, 2022, with the Korean Intellectual Property Office, the disclosure of which is incorporated herein in its entirety by reference.

BACKGROUND

1. Technical Field

The disclosed embodiments relate to a network alignment method and apparatus, and more particularly to a method and apparatus for gradually aligning networks using dual-perception similarity.

2. Description of the Related Art

Network data (or graph data) is very useful data for explaining various objects and relationships between objects, such as social networks, relational networks, molecular structures, and recommendation systems. Network data (hereinafter referred to as network) is composed of nodes corresponding to each object and edges connecting the nodes according to the relationship between the nodes, so that the correlation between various objects can be analyzed. For example, in a social network, a node may represent a user and an edge may represent a relationship between users (for example, friends), and in a relational network, a node may represent an individual paper and an edge may represent a citation relationship. In addition, in a recommendation system, a node may be a user or a product, and an edge may appear as a recommendation relationship.

Meanwhile, a multi-network means a network in which different networks include at least one node for the same object. Multi-networks are used in applications ranging from computer vision, bioinformatics, web mining, and chemistry to social network analysis.

In a multi-network, it is very important to search nodes for the same object in a plurality of nodes included in each network. In addition, the task of searching for corresponding nodes in different networks is called Network Alignment (NA) (or also called graph matching). That is, network alignment refers to the task of detecting nodes corresponding to each other between two different networks based on the structure and node properties of each network. Network alignment can be used as an initial task for downstream machine learning tasks on multiple networks. For example, if different accounts of the same user are identified through network alignment in various social networks (eg, Facebook, Twitter, etc.), friend recommendation, user behavior prediction, personalized advertising and the like can be easily performed. In addition, when a specific protein-protein interaction (PPI) network is aligned in bioinformatics, it is possible to effectively prioritize candidate genes.

Currently, network alignment is mainly performed using an artificial neural network, but there is a limitation in that alignment accuracy is low.

SUMMARY OF THE INVENTION

An object of the present disclosure is to provide a network alignment method and apparatus capable of performing network alignment with high accuracy even when the properties of nodes included in the network are different or the network size difference is large.

Another object of the present disclosure is to provide a network alignment method and apparatus for gradually aligning a plurality of nodes by calculating an embedding similarity and a Tversky similarity between different network nodes and obtaining a dual-perception similarity based on the calculated embedding similarity and Tversky similarity.

A network alignment method according to an embodiment of the present disclosure, conceived to achieve the objectives above, comprises the steps of: receiving a source network and a target network as inputs and performing a neural network operation respectively, thereby vectorizing a plurality of nodes of each of the two networks; calculating a dual-perception similarity based on an embedding similarity, which is a similarity between the vectorized nodes of each of the two networks, and a Tversky similarity representing the ratio of the number of previously aligned nodes included in a neighboring node to the normalized number of neighboring nodes of each combined node when configuring a node pair by combining nodes that are not aligned in the two networks; and selecting node pairs to be aligned among a plurality of nodes of the two networks based on the dual-perception similarity, thereby partially aligning the two networks, and iteratively partially aligning so that the number of node pairs aligned in the two networks gradually increases according to the dual-perception similarity updated according to the two partially aligned networks.

The step of vectorizing may include performing a neural network operation on the two networks with two neural networks having the same structure having L layers and the same learning weight, to obtain L source embedding vector sets ($H_s^{(l)}$) and L target embedding vector sets ($H_t^{(l)}$) output from the L layers of the two neural networks.

The step of calculating a dual-perception similarity may include obtaining the embedding similarity by weighting a source embedding vector set ($H_s^{(l)}$) with a target embedding vector set ($H_t^{(l)}$) output from the same layer (l) of the L source embedding vector sets and the L target embedding vector sets, configuring a plurality of mock node pairs by combinations of the remaining nodes except for the previously aligned node pairs in two networks that are repeatedly partially aligned, checking neighboring nodes of the nodes combined in the mock node pairs and nodes of other networks aligned with the previously aligned nodes among the neighboring nodes, thereby iteratively calculating the Tversky similarity, and iteratively calculating the dual-perception similarity by element-multiplying the embedding similarity and the iteratively calculated Tversky similarity.

The step of iteratively calculating the Tversky similarity may include configuring a mock node pair (u, v) by combining nodes that are not previously aligned in the two networks, obtaining a set of neighboring nodes ($\mathcal{N}_{G_s,u}$, $\mathcal{N}_{G_t,v}$) of each node of the mock node pair (u, v), searching previously aligned nodes among the nodes included in the neighbor node set ($\mathcal{N}_{G_s,u}$) obtained from the source network among the two networks, checking neighbor aligned cross-network nodes that are nodes of the target network among the two networks corresponding to the previously aligned nodes, thereby calculating the Tversky similarity.

The step of calculating the Tversky similarity may include calculating the neighbor aligned cross-network nodes $$\left(\mathcal{T}_u^{(i)} = \{\pi^{(i)}(x) \mid x \in (\mathcal{N}_{G_s,u} \cap \tilde{\mathcal{V}}_s^{(i)})\}\right),$$

$\pi^{(i)}(x)$ is a mapping function for a pair of aligned nodes (x, y), wherein $\pi^{(i)}(x)=y$ representing nodes of the target network ($G_t$) aligned corresponding to nodes included in the source neighbor node set ($\mathcal{N}_{G_s,u}$) for the nodes (u) of the source network ($G_s$) among the mock node pair (u, v) and at the same time included in a source cumulative alignment node set ($\tilde{\mathcal{V}}_s^{(i)}$) that is a set of nodes of the source network ($G_s$) aligned up to the previous i-th iteration, and calculating the Tversky similarity according to the equation $$S_{Tve}^{(i)}(u, v) = \frac{|X_u^{(i)} \cap Y_v^{(i)}|}{|X_u^{(i)} \cap Y_v^{(i)}| + \alpha|X_u^{(i)} - Y_v^{(i)}| + \beta|Y_v^{(i)} - X_u^{(i)}|}$$

(wherein $X_u^{(i)}$ is $$X_u^{(i)} = (\mathcal{N}_{G_s,u} - \tilde{\mathcal{V}}_s^{(i)}) \cup \mathcal{T}_u^{(i)},$$

$Y_u^{(i)}$ is the target neighbor node set ($Y_v^{(i)} = \mathcal{N}_{G_t,v}$), - represents a difference set, and |·| is a cardinality function that counts the number of elements in a set. In addition, $\alpha$ and $\beta$ are normalization parameters to compensate for the difference in the number of neighboring nodes due to the difference in scale between the two networks.).

The normalization parameters may be set to $\alpha=n_s/n_t$ and $\beta=1$ when the number of nodes ($n_s$) of the source network ($G_s$) of the two networks is greater than the number of nodes ($n_t$) of the target network ($G_t$).

The step of iteratively partially aligning may include partially aligning by selecting a predetermined number of node pairs having the highest dual-perception similarity in each iteration.

The step of iteratively partially aligning may include partially aligning by selecting node pairs whose dual-perception similarity is equal to or greater than the specified criterion similarity in each iteration.

A network alignment apparatus according to an embodiment of the present disclosure, conceived to achieve the objectives above, receives a source network and a target network as inputs and performs a neural network operation respectively, thereby vectorizing a plurality of nodes of each of the two networks, calculates a dual-perception similarity based on an embedding similarity, which is a similarity between the vectorized nodes of each of the two networks, and a Tversky similarity representing the ratio of the number of previously aligned nodes included in a neighboring node to the normalized number of neighboring nodes of each combined node when configuring a node pair by combining nodes that are not aligned in the two networks, and selects a pair of nodes to be aligned among a plurality of nodes of the two networks based on the dual-perception similarity, thereby partially aligning the two networks, and iteratively partially aligns so that the number of node pairs aligned in the two networks gradually increases according to the dual-perception similarity updated according to the two partially aligned networks.

Accordingly, the network alignment method and apparatus according to the embodiments calculate the embedding similarity and the Tversky similarity between different network nodes, obtain the dual-perception similarity based on the calculated embedding similarity and Tversky similarity, and perform a gradual alignment on a plurality of nodes, so that they are capable of performing network alignment with high accuracy even when the properties of nodes included in the network are different or the network size difference is large.

DETAILED DESCRIPTION OF THE INVENTION

Hereinafter, exemplary embodiments of the present disclosure will be described in detail with reference to the drawings. The following detailed description is provided to help comprehensive understanding of a method, an apparatus, and/or a system disclosed herein. However, this is merely exemplary, and the present disclosure is not limited thereto.

While describing the present disclosure, when it is determined that a detailed description of a known art related to the present disclosure may unnecessarily obscure the gist of the present disclosure, the detailed description will be omitted. Terms which will be used below are defined in consideration of functionality in the present disclosure, which may vary according to an intention of a user or an operator or a usual practice. Therefore, definitions thereof should be made on the basis of the overall contents of this specification. Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," and "including," when used herein, specify the presence of stated features, numerals, steps, operations, elements, or combinations thereof, but do not preclude the presence or addition of one or more other features, numerals, steps, operations, elements, or combinations thereof. Also, terms such as "unit", "device", "module", "block", and the like described in the specification refer to units for processing at least one function or operation, which may be implemented by hardware, software, or a combination of hardware and software.

Figure 1A:
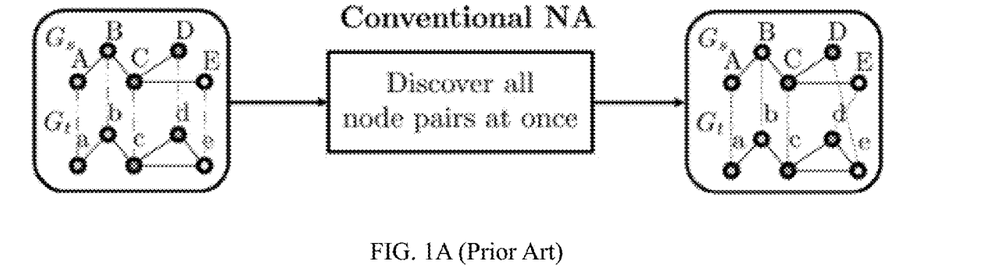
FIGS. 1A and 1B are diagrams for explaining a concept of aligning a network by a network alignment apparatus according to an embodiment.
Figure 1B:
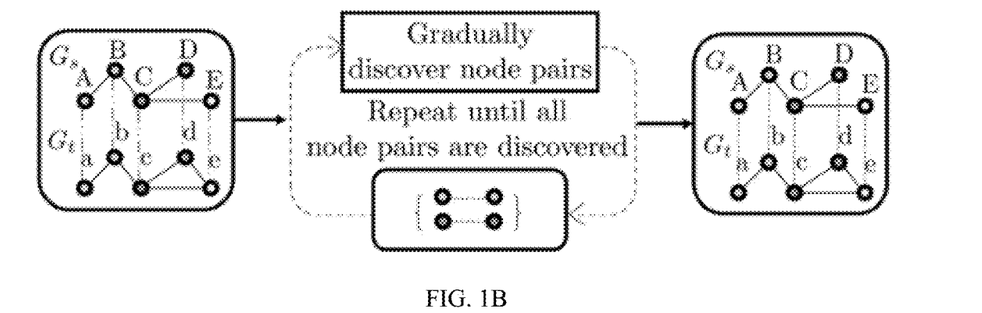

FIGS. 1A and 1B are diagrams for explaining a concept of aligning a network by a network alignment apparatus according to an embodiment. FIG. 1A shows a network alignment conventionally performed using an artificial neural network, and FIG. 1B shows a network alignment to be performed in this embodiment.

As shown in FIG. 1A, in the conventional network alignment using an artificial neural network, the artificial neural network performed a neural network operation on a source network ($G_s$) and a target network ($G_t$), so that, among a plurality of source nodes included in a source node set ($V_s$) of the source network ($G_s$) and a plurality of target nodes included in a target node set ($V_t$) of the target network ($G_t$), all alignment node pairs that could be aligned (or matched) were discovered at once. At this time, the artificial neural network discovers the alignment node pairs in a node set ($V_s$, $V_t$) based on a property set ($X_s$, $X_t$) for nodes of the node set ($V_s$, $V_t$) and a edge set ($E_s$, $E_t$) connecting nodes of each node set ($V_s$, $V_t$), thereby aligning the network.

However, as shown in FIG. 1A, when all alignment node pairs are discovered at once in the node set ($V_s$, $V_t$), there is a limit in that the network alignment accuracy is low due to several problems.

First of all, in the conventional network alignment, alignment node pairs are discovered and aligned under the assumption that the node sets ($V_s$, $V_t$) of different networks ($G_s$, $G_t$) are consistent. That is, even in the case of nodes of different networks ($G_s$, $G_t$), alignment node pairs are discovered by assuming that nodes for the same object have similar properties or edge connection structures.

However, in many cases, the node sets ($V_s$, $V_t$) of the network ($G_s$, $G_t$) may have different property sets ($X_s$, $X_t$) or have a connection structure according to the edge set ($E_s$, $E_t$). For example, a user of a social network may differently set an identifier or user information corresponding to a property of a node for each social network, and may differently set friends represented by a connection structure between nodes by an edge.

In addition, there is a problem that the size of the two different networks ($G_s$, $G_t$) can be very different in the conventional network alignment. For example, when the number of users of two different social networks is 5000 and 1000, respectively, there is a very large difference in the number of nodes ($n_s$, $n_t$) included in the two networks ($G_s$, $G_t$). In this case, there are a large number of nodes that cannot be discovered as an alignment node pair when performing network alignment. In addition, a large number of nodes that cannot be aligned becomes a factor in misdetection of an alignment node pair.

As described above, the conventional network alignment shown in FIG. 1A is configured to discover all alignment node pairs to be aligned in node sets ($V_s$, $V_t$) included in two networks ($G_s$, $G_t$) at once, and accordingly, even when the node sets ($V_s$, $V_t$) of the two networks ($G_s$, $G_t$) have different property sets ($X_s$, $X_t$) and connection structures according to edge sets ($E_s$, $E_t$), and thus it is inaccurate whether or not they correspond to each other, alignment node pairs are immediately discovered without supplementing it. Accordingly, it has low network alignment accuracy.

Meanwhile, the network alignment according to the present embodiment shown in FIG. 1B first discovers node pairs having a relatively high similarity as alignment node pairs in the node sets ($V_s$, $V_t$) included in the two networks ($G_s$, $G_t$), in order to overcome the limitations of the conventional network alignment. Then, among the neighboring nodes connected to each node of mock node pairs obtained by combining the not-aligned nodes, the number of alignment nodes previously discovered as alignment node pairs is checked. Thereafter, a weight according to the ratio of the number of alignment nodes to the number of neighboring nodes is weighted on the similarity between nodes of the mock node pair, and the next alignment node pairs are additionally discovered based on the weighted similarity. That is, after discovering some alignment node pairs having high similarity in the two networks ($G_s$, $G_t$), a weight is given to nodes having many alignment node pairs already discovered in their neighbors among the remaining nodes, and the process of discovering the next alignment node pairs is repeated. Accordingly, the number of alignment node pairs discovered in the node set ($V_s$, $V_t$) of the network ($G_s$, $G_t$) is gradually increased.

That is, in this embodiment, the accuracy of network alignment can be greatly improved, by using an alignment node pair having a high similarity and thus previously aligned, as a weight for a connection relationship between nodes when discovering another matching node pairs.

Figure 2:
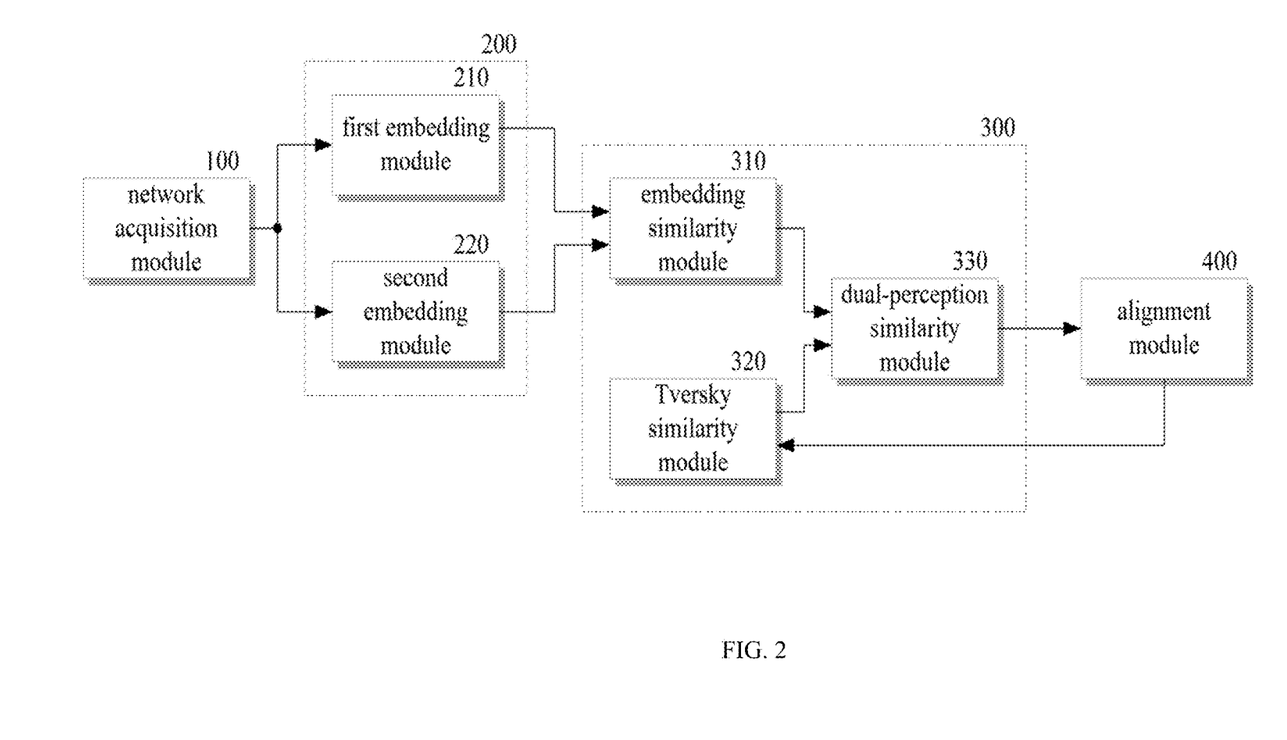
FIG. 2 shows components of a network alignment apparatus according to an embodiment, divided according to operations performed.
Figure 3:
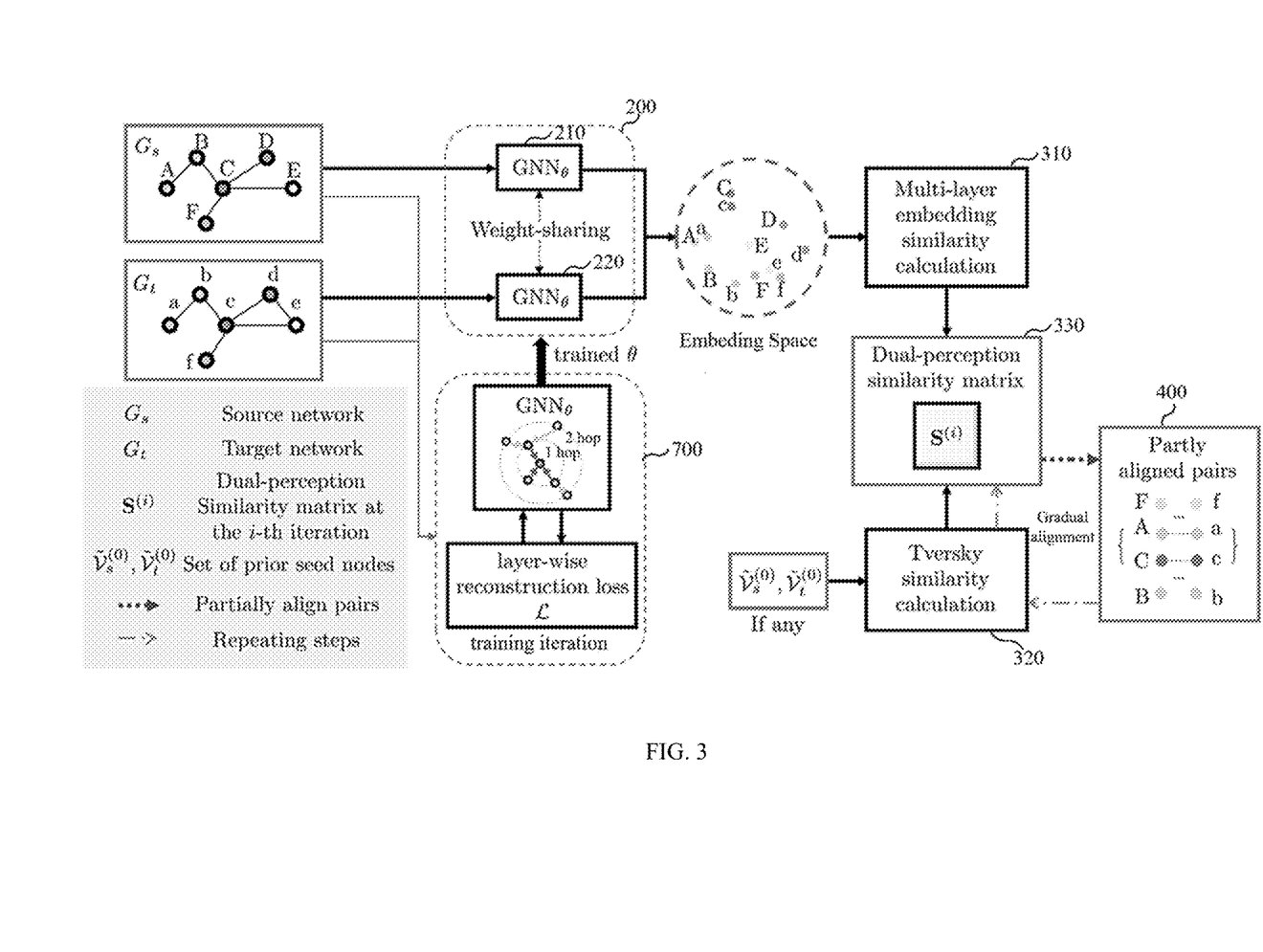
FIG. 3 shows operations performed in each component of the network alignment apparatus of FIG. 2.

FIG. 2 shows components of a network alignment apparatus according to an embodiment, divided according to operations performed, and FIG. 3 shows operations performed in each component of the network alignment apparatus of FIG. 2.

In the illustrated embodiment, each component may have different functions and capabilities other than those described below, and may include additional components other than those described below. In addition, in an embodiment, each component may be implemented using one or more physically separated devices, implemented by one or more processors or a combination of one or more processors and software, and may not be clearly distinguished in specific operations, unlike the illustrated example.

In addition, the network alignment apparatus shown in FIG. 2 may be implemented in a logic circuit by hardware, firmware, software, or a combination thereof, or may be implemented using a general-purpose or special-purpose computer. The apparatus may also be implemented using a hardwired device, a field programmable gate array (FPGA), an application specific integrated circuit (ASIC), or the like. In addition, the apparatus may be implemented as a System on Chip (SoC) including one or more processors and controllers.

In addition, the network alignment apparatus may be mounted in the form of software, hardware, or a combination thereof in a computing device or server equipped with hardware elements. The computing device or server may refer to various devices including all or part of communication devices such as communication modems for communicating with various devices or wired/wireless communication networks, a memories that store data for executing programs, microprocessors for executing programs to calculate and command, and the like.

Referring to FIG. 2, the network alignment apparatus according to an embodiment may include a network acquisition module 100, a network embedding module 200, a similarity calculation module 300 and an alignment module 400.

The network acquisition module 100 acquires two networks ($G_s$, $G_t$) to be network-aligned. Here, one of the two networks ($G_s$, $G_t$) is referred to as a source network ($G_s$), and the other is referred to as a target network ($G_t$).

In addition, each of the two networks ($G_s$, $G_t$) includes a node set ($V_s$, $V_t$) including a plurality of nodes, a property set ($X_s$, $X_t$) representing property information for each of the plurality of nodes (u, v) of the node set ($V_s$, $V_t$), and an edge set ($E_s$, $E_t$) representing a connection structure between the plurality of nodes in each network ($G_s$, $G_t$) ($G_s=(V_s, X_s, E_s)$, $G_t=(V_t, X_t, E_t)$). When the number of nodes included in the node set ($V_s$, $V_t$) is $n_s$ and $n_t$, respectively, the property set ($X_s$, $X_t$) may have a size of $\mathcal{X}_s \in \mathbb{R}^{n_s \times d}$ and $\mathcal{X}_t \in \mathbb{R}^{n_t \times d}$ depending on the number of properties (d) for each node.

The purpose of the network alignment apparatus is to align two networks ($G_s$, $G_t$) by mapping ($\pi: V_s \to V_t$, wherein $\pi(u)=v$, and $\pi^{-1}(v)=u$) nodes of a node set ($V_s$, $V_t$) corresponding to each other in a one-to-one manner among nodes ($u \in V_s$, $v \in V_t$) of the node set ($V_s$, $V_t$) in the two networks ($G_s=(V_s, X_s, E_s)$, $G_t=(V_t, X_t, E_t)$).

The network acquisition module 100 may be implemented with a computer readable memory or storage medium in which a plurality of networks are stored, or may be implemented with a communication module that receives networks stored in a database or the like. When a plurality of networks are acquired, the network acquisition module 100 may select two networks ($G_s$, $G_t$) for which network alignment is to be performed among the acquired plurality of networks and transmit them to the network embedding module 200. In this case, each of the two transmitted networks may be a partial network in which some nodes and edges are extracted from the corresponding entire network.

As shown in FIG. 3, the network embedding module 200 may vectorize each of a plurality of nodes of the node set ($V_s$, $V_t$) of each network ($G_s$, $G_t$) by performing a neural network operation on each of the two networks ($G_s$, $G_t$) transmitted from the network acquisition module 100 and project them into a virtual embedding space, thereby obtaining a hidden representation.

The network embedding module 200 may project a plurality of nodes of the node set ($V_s$, $V_t$) into an embedding space by using a network embedding (NE) technique that models high-order connection information of the network ($G_s$, $G_t$) as a vector on a low-dimensional virtual embedding space.

The network embedding module 200 may be implemented with an artificial neural network, for example, with a graph neural network (hereinafter, GNN). The network embedding module 200 implemented with a GNN may vectorize each node by analyzing the property set ($X_s$, $X_t$) and the edge set ($E_s$, $E_t$) through a neural network operation, and place them in the embedding space. The network embedding module 200 may cause similar nodes to be closely placed, while dissimilar nodes to be placed far apart in the embedding space.

The network embedding module 200 may include a first embedding module 210 and a second embedding module 220. The first embedding module 210 may obtain a plurality of source embedding vector sets ($H_s^{(l)}$) by receiving the source network ($G_s$) of the two networks ($G_s$, $G_t$) and performing a neural network operation, and the second embedding module 220 may obtain a plurality of target embedding vector sets ($H_t^{(l)}$) by receiving the target network ($G_t$) and performing a neural network operation. In addition, each of the first and second embedding modules 210 and 220 may project and place each node included in the source node set ($V_s$) and the target node set ($V_t$) into the embedding space according to the obtained plurality of source embedding vector sets ($H_s^{(l)}$) and plurality of target embedding vector sets ($H_t^{(l)}$).

Each of the first and second embedding modules 210 and 220 may be implemented with an artificial neural network such as GNN. That is, the network embedding module 200 can be implemented with two GNNs. However, when the first and second embedding modules 210 and 220 vectorize the nodes of the source node set ($V_s$) and the target node set ($V_t$) by performing neural network operations in different ways, the plurality of nodes are placed in different embedding spaces. Accordingly, node pairs that match each other cannot be discovered. Accordingly, as shown in FIG. 3, the network embedding module 200 may be implemented with Siamese Neural Networks having the same structure and learning weight, so that the nodes of the source node set ($V_s$) and the target node set ($V_t$) are projected into the same embedding space.

The first and second embedding modules 210 and 220 may be implemented with a GNN having L (L is a natural number) number of layers. The first and second embedding modules 210 and 220 may obtain L source embedding vector sets ($H_s^{(l)} \in \mathbb{R}^{n_s \times h}$) and L target embedding vector sets ($H_t^{(l)} \in \mathbb{R}^{n_t \times h}$) by distinguishing hidden representations (also referred to as feature maps) estimated in each of the L layers. Here, l denotes l l ($l=\{1, \ldots, L\}$)th layer among the L layers, and h denotes the dimension of each embedding vector.

The similarity calculation module 300 calculates the embedding similarity ($S_{emb}$, $S_{emb} \in \mathbb{R}^{n_s \times n_t}$) between the nodes of the source node set ($V_s$) and the target node set ($V_t$) using the L source embedding vector sets ($H_s^{(l)}$) and the L target embedding vector sets ($H_t^{(l)}$) obtained from the network embedding module 200. That is, the similarity between the vectorized nodes is calculated.

In addition, the similarity calculation module 300 suppresses the occurrence of false positives due to the difference in scale between the two networks ($G_s$, $G_t$), that is, the difference in the number of nodes ($n_s$, $n_t$) in the source node set ($V_s$) and the target node set ($V_t$), and at the same time additionally refers to the relationship of the previously aligned alignment node pairs, thereby calculating the Tversky similarity ($S_{Tve}$) to discover the next node pairs to be aligned with high accuracy. Here, when configuring node pairs by combinations of nodes that are not aligned in the two networks ($G_s$, $G_t$), the Tversky similarity ($S_{Tve}$) may be calculated as a ratio of the number of previously aligned nodes included in a neighbor node to the normalized number of neighbor nodes of each combined node.

In addition, the similarity calculation module 300 calculates the dual-perception similarity (S) by weighting the Tversky similarity ($S_{Tve}$) to the embedding similarity ($S_{emb}$). That is, the similarity calculation module 300 calculates the similarity between the nodes of the source node set ($V_s$) of the source network ($G_s$) and the target node set ($V_t$) of the target network ($G_t$) from two viewpoints of embedding similarity ($S_{emb}$) and Tversky similarity ($S_{Tve}$), and combines them to obtain the dual-perception similarity (S).

Meanwhile, in this embodiment, the alignment module 400 selects node pairs to be newly aligned according to the dual-perception similarity (S) obtained in the similarity calculation module 300, and aligns (matches) the selected node pairs, thereby partially aligning the two networks ($G_s$, $G_t$). Here, the alignment module 400 may select, as alignment node pairs, a predetermined number of node combinations having the highest dual-perception similarity (S) among node combinations composed of two nodes that are not aligned with each other in the two networks ($G_s$, $G_t$), or may select, as alignment node pairs, node combinations whose dual-perception similarity (S) is calculated to be equal to or greater than a specified criterion similarity.

In addition, when the similarity calculation module 300 again updates the dual-perception similarity (S) for the two aligned networks ($G_s$, $G_t$), the alignment module 400 repeats a process of selecting and aligning some node pairs as alignment node pairs according to the updated dual-perception similarity (S). It is to build a strong structural consistency between the two networks ($G_s$, $G_t$) that the alignment module 400 iteratively selects alignment node pairs to gradually expand the alignment of the two networks ($G_s$, $G_t$).

Figure 4A:
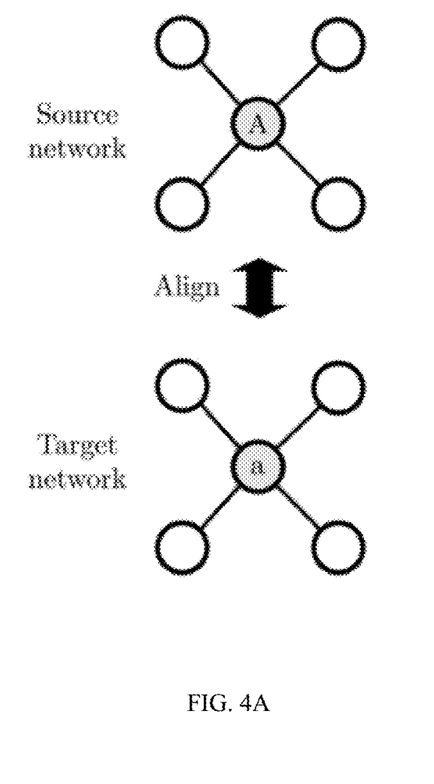
FIGS. 4A and 4B are diagrams for explaining the structural consistency of different networks.
Figure 4B:
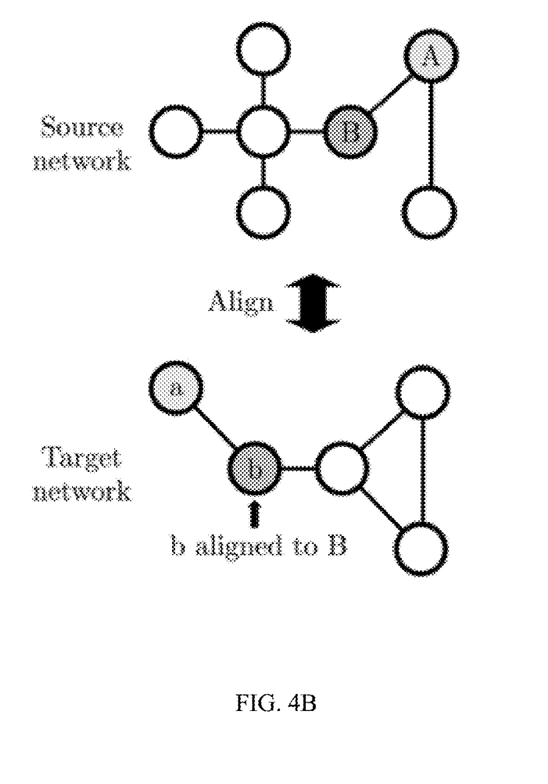
Figure 5:
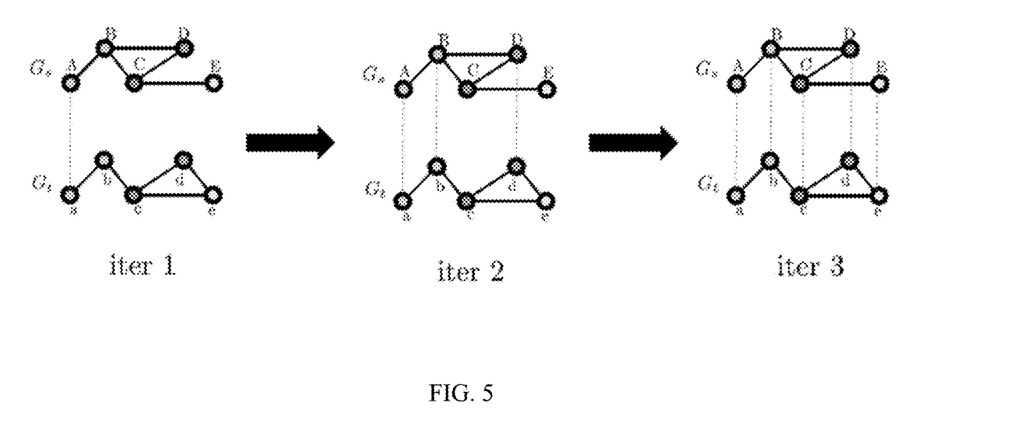
FIG. 5 shows an example of network alignment in which the alignment is gradually expanded according to the number of iterations.

FIGS. 4A and 4B are diagrams for explaining the structural consistency of different networks, and FIG. 5 shows an example of network alignment in which the alignment is gradually expanded according to the number of iterations.

In FIG. 4A, the edge connection configurations of the nodes in the two networks ($G_s$, $G_t$) are the same, resulting in strong structural consistency, and in this case, it is possible to easily estimate the node (a) of the target network ($G_t$) that should be aligned with the node (A) of the source network ($G_s$). On the other hand, in FIG. 4B, the edge connection configurations of the nodes in the two networks ($G_s$, $G_t$) are very different, resulting in weak structural consistency. In this case, it is very difficult to estimate the node (a) of the target network ($G_t$) to be aligned with the node (A) of the source network ($G_s$). However, if the node (B) of the source network ($G_s$) and the node (b) of the target network ($G_t$) are aligned in advance, the node (a) to be aligned with the node (A) can be easily discovered by searching for neighboring nodes based on the aligned node pair (B, b). That is, when using (B, b) previously aligned, node pairs to be aligned later can be discovered very efficiently and accurately.

Accordingly, in this embodiment, as shown in FIG. 5, the alignment module 400 does not discover all alignment node pairs of the two networks ($G_s$, $G_t$) at once, but partially discovers the alignment node pairs in every iteration so that the alignment of the two networks ($G_s$, $G_t$) is gradually expanded. In FIG. 5, it can be seen that in the first iteration (iter1), only the node pair (A, a) was aligned, but in the second iteration (iter2), two node pairs ((B, b), (D, d)) were aligned, and in the third iteration (iter3), the remaining two node pairs ((C, c), (E, e)) were additionally aligned.

In this way, the alignment module 400 may obtain a cumulative alignment node set ( $\tilde{\mathcal{V}}_s^{(i)} = \tilde{\mathcal{V}}_s^{(i-1)} \cup \hat{\mathcal{V}}_s^{(i)}$, $\tilde{\mathcal{V}}_t^{(i)} = \tilde{\mathcal{V}}_t^{(i-1)} \cup \hat{\mathcal{V}}_t^{(i)}$ ) by adding a new alignment node set ( $\hat{\mathcal{V}}_s^{(i)}$, $\hat{\mathcal{V}}_t^{(i)}$ ) newly additionally aligned in every iteration (i) to an initial seed node set ( $\tilde{\mathcal{V}}_s^{(0)}$, $\tilde{\mathcal{V}}_t^{(0)}$ ) initially aligned in each of the two networks ($G_s$, $G_t$). That is, the alignment module 400 repeatedly additionally aligns some node pairs in the two networks ($G_s$, $G_t$) according to the perception similarity ($S^{(i)}$) (where i is the number of iterations) that is repeatedly updated and calculated in the similarity calculation module 300, so that the number of node pairs included in the cumulative alignment node set ( $\tilde{\mathcal{V}}_s^{(i)}$, $\tilde{\mathcal{V}}_t^{(i)}$ ) is gradually increased.

When the total number of alignment node pairs to be discovered is M and the alignment module 400 discovers N alignment node pairs at each iteration (i), the alignment module 400 may iteratively discover N alignment node pairs until the number of iterations (i) becomes $$\left\lceil \frac{M}{N} \right\rceil + 1$$

(wherein $\lceil \cdot \rceil$ is a ceiling operator).

The initial seed node set ( $\tilde{\mathcal{V}}_s^{(0)}$, $\tilde{\mathcal{V}}_t^{(0)}$ ) may be an empty set ($\emptyset$), for example. If the initial seed node set ( $\tilde{\mathcal{V}}_s^{(0)}$, $\tilde{\mathcal{V}}_t^{(0)}$ ) is the empty set ($\emptyset$), the alignment module 400 may obtain the new alignment node set ( $\hat{\mathcal{V}}_s^{(i)}$, $\hat{\mathcal{V}}_t^{(i)}$ ) by using the embedding similarity ($S_{emb}$) as the initial dual-perception similarity ($S^{(0)}$).

In addition, the similarity calculation module 300 iteratively calculates the updated perception similarity ($S^{(i+1)}$) according to the cumulative alignment node set ( $\tilde{\mathcal{V}}_s^{(i)}$, $\tilde{\mathcal{V}}_t^{(i)}$ ) of the two networks ($G_s$, $G_t$) that are increased. At this time, the similarity calculation module 300 does not iteratively calculate the embedding similarity ($S_{emb}$), but iteratively calculates the Tversky similarity ($S_{Tve}^{(i)}$) based on the alignment node pairs previously aligned in the alignment module 400, and may also iteratively update and obtain the dual-perception similarity ($S^{(i)}$), by weighting the embedding similarity ($S_{emb}$) with the Tversky similarity ($S_{Tve}^{(i)}$) calculated in each iteration.

The similarity calculation module 300 may include an embedding similarity module 310, a Tversky similarity module 320 and a dual-perception similarity module 330.

The embedding similarity module 310 may calculate the embedding similarity ($S_{emb}$) according to the distance between the nodes vectorized and projected on the embedding space. The distance between the nodes can be calculated as shown in Equation 1 in the form of matrix multiplication of the L source embedding vector sets ($H_s^{(l)}$) and the L target embedding vector sets ($H_t^{(l)}$) obtained by the network embedding module 200.

$$S_{emb} = \sum_l H_s^{(l)} H_t^{(l)\top} \quad \text{[Equation 1]}$$

wherein $H_t^{(l)\top}$ denotes the transpose of the target embedding vector set ($H_t^{(l)}$) output from the lth layer (l).

As shown in Equation 1, the embedding similarity module 310 may obtain a similarity matrix for each layer by matrix-multiplying transpose matrices ( $H_t^{(l)\top}$ ) of a source embedding vector set ($H_s^{(l)}$) and a target embedding vector set ($H_t^{(l)}$) output from the same layer (l) in L source embedding vector sets ($H_s^{(l)}$) and L target embedding vector sets ($H_t^{(l)}$), and may calculate the embedding similarity ($S_{emb}$) by summing them. That is, it can be seen that the embedding similarity ($S_{emb}$) is obtained by weighting the source embedding vector set ($H_s^{(l)}$) for each layer with the target embedding vector set ($H_s^{(l)}$) output from the same layer.

Meanwhile, as described above, the Tversky similarity module 320 calculates the Tversky similarity ($S_{Tve}$) as a ratio of the number of previously aligned nodes included in neighboring nodes to the normalized number of neighboring nodes of each node in a node pair consisting of a combination of nodes that are not aligned in the two networks ($G_s$, $G_t$). Here, the reason why the Tversky similarity module 320 calculates the Tversky similarity by normalizing the number of neighboring nodes of each node is to compensate for errors that may occur due to the difference in scale of the two networks ($G_s$, $G_t$).

Specifically, the Tversky similarity module 320 first configures a plurality of mock node pairs (u, v) according to all possible combinations of source nodes (u∈ $V_s$) that are not aligned in the source network ($G_s$) and target nodes (v∈ $V_t$) that are not aligned in the target network ($G_t$) up to the previous iteration (i-1). Then, a source neighbor node set ($\mathcal{N}_{G_s,u}$) composed of 1-hop neighbor nodes of the source node (u) and a target neighbor node set ($\mathcal{N}_{G_t,v}$) composed of 1-hop neighbor nodes of the target node (v) are obtained for each of the plurality of mock node pairs (u, v).

When the source neighbor node set ($\mathcal{N}_{G_s,u}$) and the target neighbor node set ($\mathcal{N}_{G_t,v}$) are obtained, the Tversky similarity module 320 checks the previously aligned alignment node pairs in the source neighbor node set ($\mathcal{N}_{G_s,u}$) and the target neighbor node set ($\mathcal{N}_{G_t,v}$). When the previously aligned alignment node pairs are checked in the source neighbor node set ($\mathcal{N}_{G_s,u}$) and the target neighbor node set ($\mathcal{N}_{G_t,v}$), the the Tversky similarity module 320 may calculate the Tversky similarity ($S_{Tve}^{(i)}$) at the ith iteration according to Equation 2.

$$S_{Tve}^{(i)}(u, v) = \frac{|X_u^{(i)} \cap Y_v^{(i)}|}{|X_u^{(i)} \cap Y_v^{(i)}| + \alpha|X_u^{(i)} - Y_v^{(i)}| + \beta|Y_v^{(i)} - X_u^{(i)}|} \quad \text{[Equation 2]}$$

wherein $\mathcal{T}_u^{(i)}$ a Neighbor Aligned Cross-network Node aligned with respect to the nodes of the node set $$\left(\mathcal{T}_u^{(i)} = \left\{\pi^{(i)}(x) \mid x \in \left(\mathcal{N}_{G_s,u} \cap \tilde{\mathcal{V}}_s^{(i)}\right)\right\}\right)$$

included in the source neighbor node set ($\mathcal{N}_{G_s,u}$) and simultaneously included in the source cumulative alignment node set ($\tilde{\mathcal{V}}_s^{(i)}$), $X_u^{(i)}$ is $X_u^{(i)}$=($\mathcal{N}_{G_s,u}$- $\tilde{\mathcal{V}}_s^{(i)}$)∪ $\mathcal{T}_u^{(i)}$, and $Y_v^{(i)}$ is the target neighbor node set ($Y_v^{(i)}$= $\mathcal{N}_{G_t,v}$) In addition, - denotes the difference set, and |·| is a cardinality function that counts the number of elements in a set. In addition, α and β are normalization parameters for compensating for a difference in the number of neighboring nodes according to a difference in scale between the two networks ($G_s$, $G_t$). For example, when the number of nodes ($n_s$) of the source network ($G_s$) is greater than the number of nodes ($n_t$) of the target network ($G_t$), $\alpha = n_s/n_t$ and $\beta = 1$ may be set.

Figure 6:
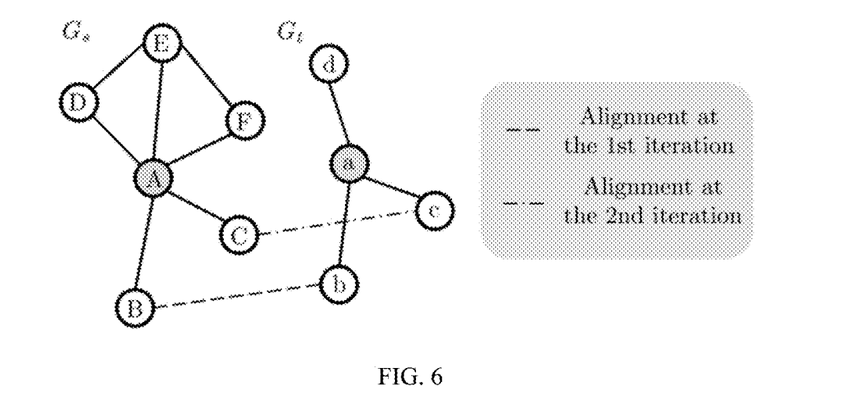
FIG. 6 is a diagram for explaining Tversky similarity.

FIG. 6 is a diagram for explaining Tversky similarity.

In FIG. 6, it is assumed that the number of nodes in the source network ($G_s$) is 6 ($n_s$=6), the number of nodes in the target network ($G_t$) is 4 ($n_t$=4), and a node pair (B, b) has already been discovered and aligned at the 1st iteration (i=1). It is also assumed that $\alpha=\frac{1}{2}$ and $\beta=1$.

In this case, the neighbor aligned cross-network node ($T_A^{(1)}$) for node A in the mock node pair (A, a) is $T_A^{(1)}$={$\pi^{(1)}(B)$}={b}. In addition, $X_A^{(1)}$={b, C, D, E, F}, $Y_A^{(1)}$={b, c, d}, and $X_A^{(1)} \cap Y_A^{(1)}$={b}. Accordingly, the Tzversky similarity ($S_{Tve}^{(1)}$) for the mock node pair (A, a) is calculated as $S_{Tve}^{(1)}$=1/(1+½*4+1*2)=⅕. Meanwhile, if the node pair (C, c) is aligned at the 2nd iteration (i=2), the neighbor aligned cross-network node ($T_A^{(2)}$) for node A in the mock node pair (A, a) is $T_A^{(2)}$={$\pi^{(2)}(B, C)$}={b, c}. In addition, $X_A^{(2)}$={b, c, D, E, F}, $Y_A^{(2)}$={b, c, d}, and $X_A^{(2)} \cap Y_A^{(2)}$={b, c}. Accordingly, the Tzversky similarity ($S_{Tve}^{(2)}$) is calculated as $S_{Tve}^{(2)}$=2/(2+(½*3)+(1*1))=4/9.

The dual-perception similarity module 330 iteratively calculates the dual-perception similarity ($S^{(i)}$) according to Equation 3, by weighting the calculated embedding similarity ($S_{emb}$) with the iteratively obtained Tversky similarity ($S_{Tve}^{(i)}$).

$$S^{(i)} = S_{emb} \odot S_{Tve}^{(i)} \quad \text{[Equation 3]}$$

wherein ⊙ is the element multiplication operator of matrices.

As a result, the network alignment apparatus of the present embodiment discovers node pairs matching each other among a plurality of nodes of the two networks ($G_s$, $G_t$) starting with a node pair having a high similarity according to the dual-perception similarity in which the embedding similarity is weighted with the Tversky similarity, wherein it does not discover all node pairs at once, but discovers such that node pairs are iteratively gradually increased. At this time, since connection information of nodes additionally generated by previously discovered node pairs is additionally reflected in the iteratively calculated Tversky similarity, network alignment can be performed very accurately.

Meanwhile, in the network alignment apparatus shown in FIG. 2, since the first and second embedding modules 210 and 220 of the network embedding module 200 are each implemented with an artificial neural network such as GNN, the weight (θ) must be updated through prior learning by a learning module 700.

Since the source embedding vector set ($H_s^{(l)}$) output from the l-th layer of the first embedding module 210 and the target embedding vector set ($H_t^{(l)}$) output from the l-th layer of the second embedding module 220 each include information about neighboring nodes up to l-hop, a layer-wise reconstruction loss (L) for training the artificial neural network constituting the network embedding module 200 using an adjacency matrix may be set as shown in Equation 4.

$$\mathcal{L} = \sum_{*\in\{s,t\}} \sum_l \left\| \tilde{D}_*^{(l)-\frac{1}{2}} \tilde{A}_*^{(l)} \tilde{D}_*^{(l)-\frac{1}{2}} - H_*^{(l)} H_*^{(l)\top} \right\|_F \quad \text{[Equation 4]}$$

wherein *(*∈ {s, t}) denotes a source (s) or a target (t), $\tilde{A}_*^{(l)} = \Sigma_{k=1}^l \hat{A}_*^k$, $\hat{A}_* = A_* + I_*$, and $I_*$ is an identity matrix. In addition, $\tilde{D}_*^{(l)}$ is a diagonal matrix with an element at position (i, i) of $\tilde{D}_*^{(l)}$(i, i)=$\Sigma_j \tilde{A}_*^{(l)}$(i, j), and $\tilde{A}_*^{(l)}$(i, j) is an (i, j) element of $\tilde{A}_*^{(l)}$. ||·||F denotes the Frobenius norm function of the matrix.

Figure 7:
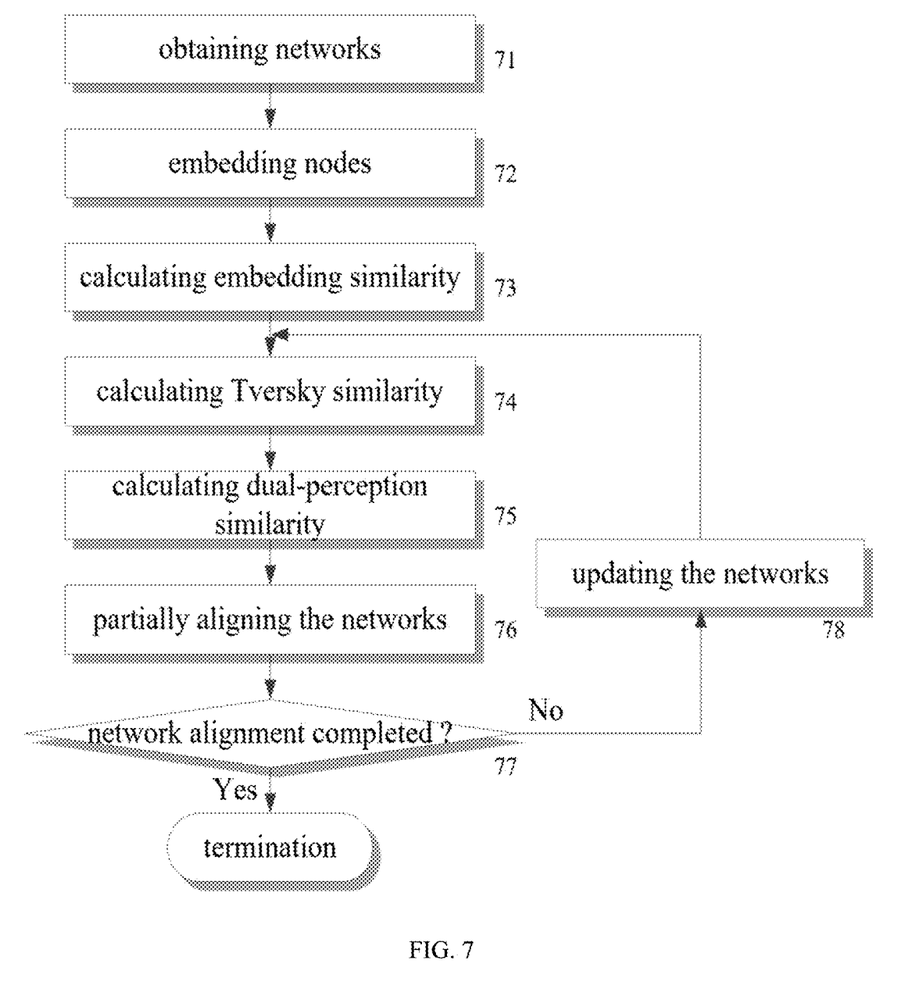
FIG. 7 shows a network alignment method according to an embodiment.

FIG. 7 shows a network alignment method according to an embodiment.

Referring to FIG. 7, the network alignment method according to the embodiment first obtains two networks ($G_s$, $G_t$) to be aligned (71). Then, by performing neural network operation with two neural networks having the same L number of layers and the same learning weight for the two networks ($G_s$, $G_t$), L source embedding vector sets ($H_s^{(l)}$) and L target embedding vector sets ($H_t^{(l)}$), which are hidden representations output from the L layers, are obtained (72).

Thereafter, among the obtained L source embedding vector sets ($H_s^{(l)}$) and L target embedding vector sets ($H_t^{(l)}$), by multiplying the source embedding vector set ($H_s^{(l)}$) by the target embedding vector set ($H_t^{(l)}$) output from the same layer, and accumulating L multiplication results, an embedding similarity ($S_{emb}$) representing the degree of proximity between nodes of the two different networks ($G_s$, $G_t$) in the virtual embedding space is calculated (73). Meanwhile, the Tversky similarity ($S_{Tve}$) is calculated as a ratio of the number of previously aligned nodes included in a neighboring node to the normalized number of neighboring nodes of each node in a node pair composed of a combination of nodes that are not aligned in the two networks ($G_s$, $G_t$) (74). Then, the calculated embedding similarity ($S_{emb}$) and Tversky similarity ($S_{Tve}$) are element-multiplied to calculate the dual-perception similarity ($S^{(i)}$) (75).

When the dual-perception similarity ($S^{(i)}$) is calculated, a node pair having a high dual-perception similarity ($S^{(i)}$) is selected by checking the dual-perception similarity ($S^{(i)}$) calculated for a mock node pair combined with nodes that are not previously aligned in the two networks ($G_s$, $G_t$), and the two networks ($G_s$, $G_t$) are partially aligned by discovering nodes of the selected node pair as the alignment node pair (76). At this time, node pairs may be selected in a designated number in the order of high dual-perception similarity ($S^{(i)}$), or node pair combinations having dual-perception similarity ($S^{(i)}$) equal to or greater than the criterion similarity may be selected, and a designated number of node pairs having dual-perception similarity ($S^{(i)}$) equal to or greater than the criterion similarity may be selected in the order of high dual-perception similarity ($S^{(i)}$).

Then, it is determined whether network alignment for the two networks ($G_s$, $G_t$) has been completed (77). Here, whether or not the network alignment is completed may be terminated when all nodes are aligned in at least one network among at least two networks ($G_s$, $G_t$), or when any node pair having a dual-perception similarity ($S^{(i)}$) equal to or greater than the criterion similarity is not discovered.

If it is determined that the network alignment is not complete, the Tversky similarity is calculated again by updating the network with alignment information for newly partially aligned nodes in the two networks ($G_s$, $G_t$) (74).

The network alignment method shown in FIG. 7 may be performed in a computing environment including a computing device.

Figure 8:
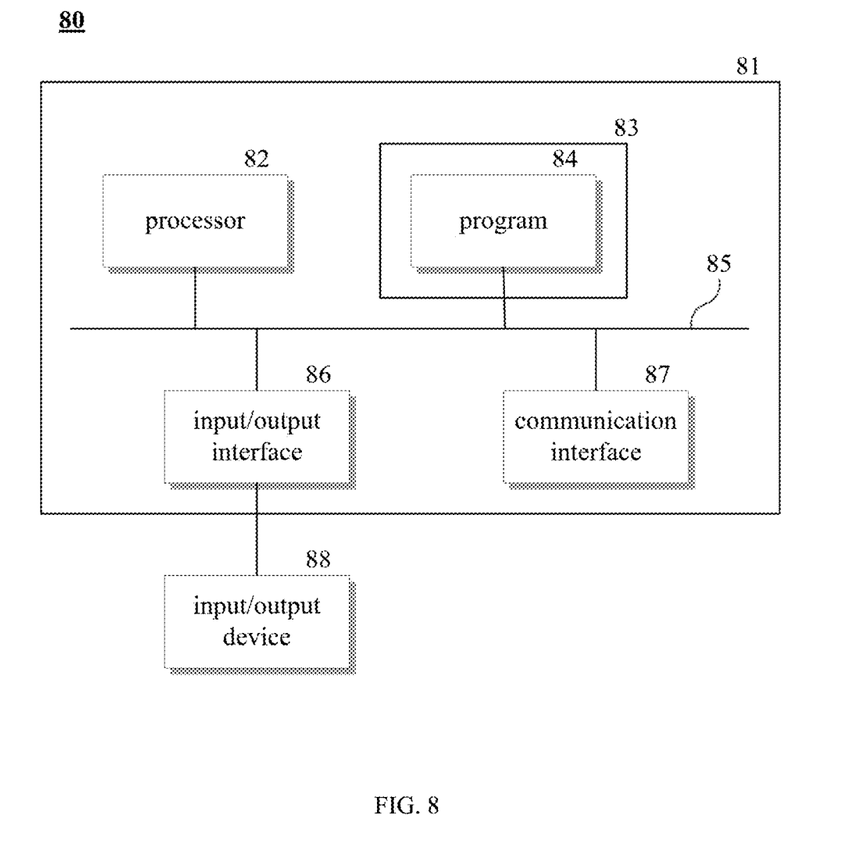
FIG. 8 is a diagram for explaining a computing environment including a computing device according to an embodiment.

FIG. 8 is a diagram for explaining a computing environment including a computing device according to an embodiment.

In the illustrated embodiment, each component may have different functions and capabilities other than those described below, and may include additional components other than those described below. The illustrated computing environment 80 includes a computing device 81.

The computing device 81 includes at least one processor 82, a computer readable storage medium 83 and a communication bus 85. The processor 82 may cause the computing device 81 to operate in accordance with the above-mentioned exemplary embodiments. For example, the processor 82 may execute one or more programs 84 stored in a computer readable storage medium 83 such as a memory. The one or more programs 84 may include one or more computer-executable instructions, and the computer-executable instructions, when executed by the processor 82, may be configured to cause computing device 81 to perform operations in accordance with an exemplary embodiment.

The communication bus 85 interconnects various other components of the computing device 81, including the processor 82 and the computer readable storage medium 83.

The computing device 81 may also include one or more input/output interfaces 86 and one or more communication interfaces 87 that provide interfaces for one or more input/output devices 88. The input/output interfaces 86 and the communication interfaces 87 are connected to the communication bus 85. The input/output device 88 may be coupled to other components of the computing device 81 through input/output interfaces 86. Exemplary input/output devices 88 may include input devices such as pointing devices (mouse, trackpad or the like), keyboards, touch input devices (touchpad, touchscreen or the like), voice or sound input devices, various types of sensor devices and/or photography devices, and/or output devices such as display devices, printers, speakers and/or network cards. The exemplary input/output devices 88 may be included inside the computing device 81 as a component constituting the computing device 81, and may also be connected to the computing device 81 as a separate device distinct from the computing device 81.

Although the present disclosure has been described in detail through representative embodiments above, those skilled in the art will understand that many modifications and other equivalent embodiments can be derived from the embodiments described herein. Therefore, the true technical scope of the present disclosure is to be defined by the technical spirit set forth in the appended scope of claims.

What is claimed is:

1. A network alignment method performed by a computing device having one or more processors and a memory storing one or more programs executed by the one or more processors, the method comprising the steps of:

receiving a source network and a target network as inputs and performing a neural network operation respectively, thereby vectorizing a plurality of nodes of each of the two networks;

calculating a dual-perception similarity based on an embedding similarity, which is a similarity between the vectorized nodes of each of the two networks, and a Tversky similarity representing a ratio of the number of previously aligned nodes included in a neighboring node to the normalized number of neighboring nodes of each combined node when configuring a node pair by combining nodes that are not aligned in the two networks; and selecting node pairs to be aligned among a plurality of nodes of the two networks based on the dual-perception similarity, thereby partially aligning the two networks, and iteratively partially aligning so that the number of node pairs aligned in the two networks gradually increases according to the dual-perception similarity updated according to the two partially aligned networks, wherein the step of vectorizing includes performing a neural network operation on the two networks with two neural networks having the same structure having L layers and the same learning weight, to obtain L source embedding vector sets ($H_s^{(l)}$) and L target embedding vector sets ($H_t^{(l)}$) output from the L layers of the two neural networks, wherein the step of calculating a dual-perception similarity includes obtaining the embedding similarity by weighting a source embedding vector set ($H_s^{(l)}$) with a target embedding vector set ($H_t^{(l)}$) output from the same layer (l) of the L source embedding vector sets and the L target embedding vector sets, configuring a plurality of mock node pairs by combinations of the remaining nodes except for the previously aligned node pairs in two networks that are repeatedly partially aligned, checking neighboring nodes of the nodes combined in the mock node pairs and nodes of other networks aligned with the previously aligned nodes among the neighboring nodes, thereby iteratively calculating the Tversky similarity, and iteratively calculating the dual-perception similarity by element-multiplying the embedding similarity and the iteratively calculated Tversky similarity.

2. The network alignment method according to claim 1, wherein the embedding similarity is calculated according to the equation $$S_{emb} = \sum_l H_s^{(l)} H_t^{(l)\top}$$

wherein $\mathbf{H}_t^{(l)\top}$ denotes a transpose matrix of the target embedding vector set ($H_t^{(l)}$) output from the l-th layer (l).

3. The network alignment method according to claim 1, wherein the step of iteratively calculating the Tversky similarity includes configuring a mock node pair (u, v) by combining nodes that are not previously aligned in the two networks, obtaining a set of neighboring nodes ($\mathcal{N}_{G_s,u}$, $\mathcal{N}_{G_t,v}$) of each node of the mock node pair (u, v), searching previously aligned nodes among the nodes included in the neighbor node set ($\mathcal{N}_{G_s,u}$) obtained from the source network among the two networks, checking neighbor aligned cross-network nodes that are nodes of the target network among the two networks corresponding to the previously aligned nodes, thereby calculating the Tversky similarity.

4. The network alignment method according to claim 1, wherein the step of iteratively partially aligning includes partially aligning by selecting a predetermined number of node pairs having the highest dual-perception similarity in each iteration.

5. The network alignment method according to claim 1, wherein the step of iteratively partially aligning includes partially aligning by selecting node pairs whose dual-perception similarity is equal to or greater than the specified criterion similarity in each iteration.

6. A network alignment apparatus having one or more processors and a memory storing one or more programs executed by the one or more processors, wherein the processors receive a source network and a target network as inputs and perform a neural network operation respectively, thereby vectorizing a plurality of nodes of each of the two networks, calculate a dual-perception similarity based on an embedding similarity, which is a similarity between the vectorized nodes of each of the two networks, and a Tversky similarity representing a ratio of the number of previously aligned nodes included in a neighboring node to the normalized number of neighboring nodes of each combined node when configuring a node pair by combining nodes that are not aligned in the two networks, and select node pairs to be aligned among a plurality of nodes of the two networks based on the dual-perception similarity, thereby partially aligning the two networks, and iteratively partially align so that the number of node pairs aligned in the two networks gradually increases according to the dual-perception similarity updated according to the two partially aligned networks, wherein the processors perform a neural network operation on the two networks with two neural networks having the same structure having L layers and the same learning weight, to obtain L source embedding vector sets and L target embedding vector sets output from the L layers of the two neural networks, wherein the processors obtain the embedding similarity by weighting a source embedding vector set ($H_s^{(l)}$) with a target embedding vector set ($H_t^{(l)}$) output from the same layer (l) of the L source embedding vector sets and the L target embedding vector sets, configure a plurality of mock node pairs by combinations of the remaining nodes except for the previously aligned node pairs in two networks that are iteratively partially aligned, check neighboring nodes of the nodes combined in the mock node pairs and nodes of other networks aligned with the previously aligned nodes among the neighboring nodes, thereby iteratively calculating the Tversky similarity, and iteratively calculate the dual-perception similarity by element-multiplying the embedding similarity and the iteratively calculated Tversky similarity.

7. The network alignment apparatus according to claim 6, wherein the processors calculate the embedding similarity according to the equation $$S_{emb} = \sum_l H_s^{(l)} H_t^{(l)\top}$$

wherein $\mathbf{H}_t^{(l)\top}$ denotes a transpose matrix of the target embedding vector set ($H_t^{(l)}$) output from the l-th layer (l).

8. The network alignment apparatus according to claim 6, wherein, in order to calculate the Tversky similarity, the processors configure a mock node pair (u, v) by combining nodes that are not previously aligned in the two networks, obtain a set of neighboring nodes ($\mathcal{N}_{G_s,u}$, $\mathcal{N}_{G_t,v}$) of each node of the mock node pair (u, v), search previously aligned nodes among the nodes included in the neighbor node set ($\mathcal{N}_{G_s,u}$) obtained from the source network among the two networks, and check neighbor aligned cross-network nodes that are nodes of the target network among the two networks corresponding to the previously aligned nodes, thereby calculating the Tversky similarity.

9. The network alignment apparatus according to claim 6, wherein the processors select and partially align a predetermined number of node pairs having the highest dual-perception similarity in each iteration.

10. The network alignment apparatus according to claim 6, wherein the processors select and partially align node pairs whose dual-perception similarity is equal to or greater than the specified criterion similarity in each iteration.

* * * * *